United States Patent
Stephens

(10) Patent No.: US 8,656,948 B2
(45) Date of Patent: Feb. 25, 2014

(54) HYDRAULIC VALVE WITH AN ANNULAR FILTER ELEMENT SECURED BY A HELICAL SPRING

(75) Inventor: Kirt N. Stephens, New Berlin, WI (US)

(73) Assignee: Husco Automotive Holdings LLC, Waukesha, WI (US)

( * ) Notice: Subject to any disclaimer, the term of this patent is extended or adjusted under 35 U.S.C. 154(b) by 198 days.

(21) Appl. No.: 13/231,486

(22) Filed: Sep. 13, 2011

(65) Prior Publication Data

US 2013/0061959 A1   Mar. 14, 2013

(51) Int. Cl.
*E03B 7/07* (2006.01)
*F16K 31/06* (2006.01)
*B01D 35/02* (2006.01)

(52) U.S. Cl.
USPC ....... 137/550; 137/545; 137/625.65; 210/432

(58) Field of Classification Search
USPC ........... 137/550, 544, 545, 547, 549, 625.65; 210/420–424, 438–439, 429–432, 459, 210/498
See application file for complete search history.

(56) References Cited

U.S. PATENT DOCUMENTS

| 911,682 | A | * | 2/1909 | Scheunert | 210/423 |
| 3,006,371 | A | * | 10/1961 | Giles | 137/550 |
| 6,120,683 | A | * | 9/2000 | Reinhart et al. | 210/100 |
| 6,848,404 | B2 | | 2/2005 | Maeyama et al. | |
| 7,000,633 | B2 | | 2/2006 | Okada et al. | |
| 7,069,947 | B2 | | 7/2006 | Maeda et al. | |
| 8,186,378 | B2 | * | 5/2012 | Nordstrom et al. | 137/550 |
| 2009/0255593 | A1 | * | 10/2009 | Nordstrom et al. | 137/544 |

FOREIGN PATENT DOCUMENTS

| DE | 102005028757 A1 | 1/2007 |
| EP | 1447602 A1 | 8/2004 |
| JP | 2001317313 | 11/2001 |
| JP | 2006022816 | 1/2006 |
| WO | 2008034879 A1 | 3/2008 |
| WO | 2008044108 A2 | 4/2008 |

* cited by examiner

*Primary Examiner* — John Rivell
*Assistant Examiner* — Michael R Reid
(74) *Attorney, Agent, or Firm* — Quarles & Brady LLP; George E. Haas

(57) ABSTRACT

A wide variety of machines have moveable members that are operated by an hydraulic actuator. For example, an internal combustion engine has a camshaft which is mechanically coupled to rotate with the crankshaft and which opens and closes cylinder intake and exhaust valves. Traditionally the camshaft timing was fixed at a setting that produced the best operation for all engine operating conditions. However, it has been recognized that engine performance can be improved if the valve timing varies as a function of engine speed, engine load, and other factors. Thus a hydraulic actuator is being used on some engines to vary the coupling relationship of the camshaft to the crankshaft. A solenoid operated valve controls the application of pressurized fluid to operate the hydraulic actuator.

20 Claims, 2 Drawing Sheets

HYDRAULIC VALVE WITH AN ANNULAR FILTER ELEMENT SECURED BY A HELICAL SPRING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic valves, and more particularly to spool type valves that have an integral filter for fluid flowing through the valve.

2. Description of the Related Art

A wide variety of machines have moveable members that are operated by an hydraulic actuator. For example, an internal combustion engine has a camshaft which is mechanically coupled to rotate with the crankshaft and which opens and closes cylinder intake and exhaust valves. Traditionally the camshaft timing was fixed at a setting that produced the best operation for all engine operating conditions. However, it has been recognized that engine performance can be improved if the valve timing varies as a function of engine speed, engine load, and other factors. Thus a hydraulic actuator is being used on some engines to vary the coupling relationship of the camshaft to the crankshaft. A solenoid operated valve control the application of pressurized fluid to operate the hydraulic actuator.

Over time, the hydraulic fluid flowing through a machine carries small particles, such as pieces of metal from the engine components. Those particles can block orifices in the valve or can become lodged so as to impede motion of valve components. The particles also may adversely affect operation of other elements of the hydraulic system. Some prior valves incorporated screens to prevent the small particles from entering the valve.

SUMMARY OF THE INVENTION

A valve arrangement comprises a body with a longitudinal bore within which is formed an interior annular recess. The annular recess has a circumferential surface through which a fluid port opens. A filter band with a plurality of apertures there through abuts the circumferential surface of the recess. The filter band extends over an opening of a fluid port into the annular recess. Preferably the filter band is shaped in a ring and specifically for example may be a strip of material bent into a cylinder with overlapping ends.

A helical spring, located within the recess, retains the filter band against the circumferential surface. The helical spring has spaced apart convolutions that engage the filter band and exert a outward radial force which maintains the filter band abutting the circumferential surface.

A valve element, such as a spool, for example, is slideably received within the longitudinal bore to control flow of fluid through the fluid port.

In one embodiment of the valve arrangement, the annular recess has two side surfaces on opposite sides of the circumferential surface, and the helical spring engages both of the side surfaces. For example, the helical spring may have a first end at which two convolutions abut each other, and has an opposite second end at which another pair of convolutions abut each other. The first and second ends of the spring engage the two side surfaces of the recess and thus the spring extends across the entire width of that recess.

DETAILED DESCRIPTION OF THE INVENTION

Figure 1:
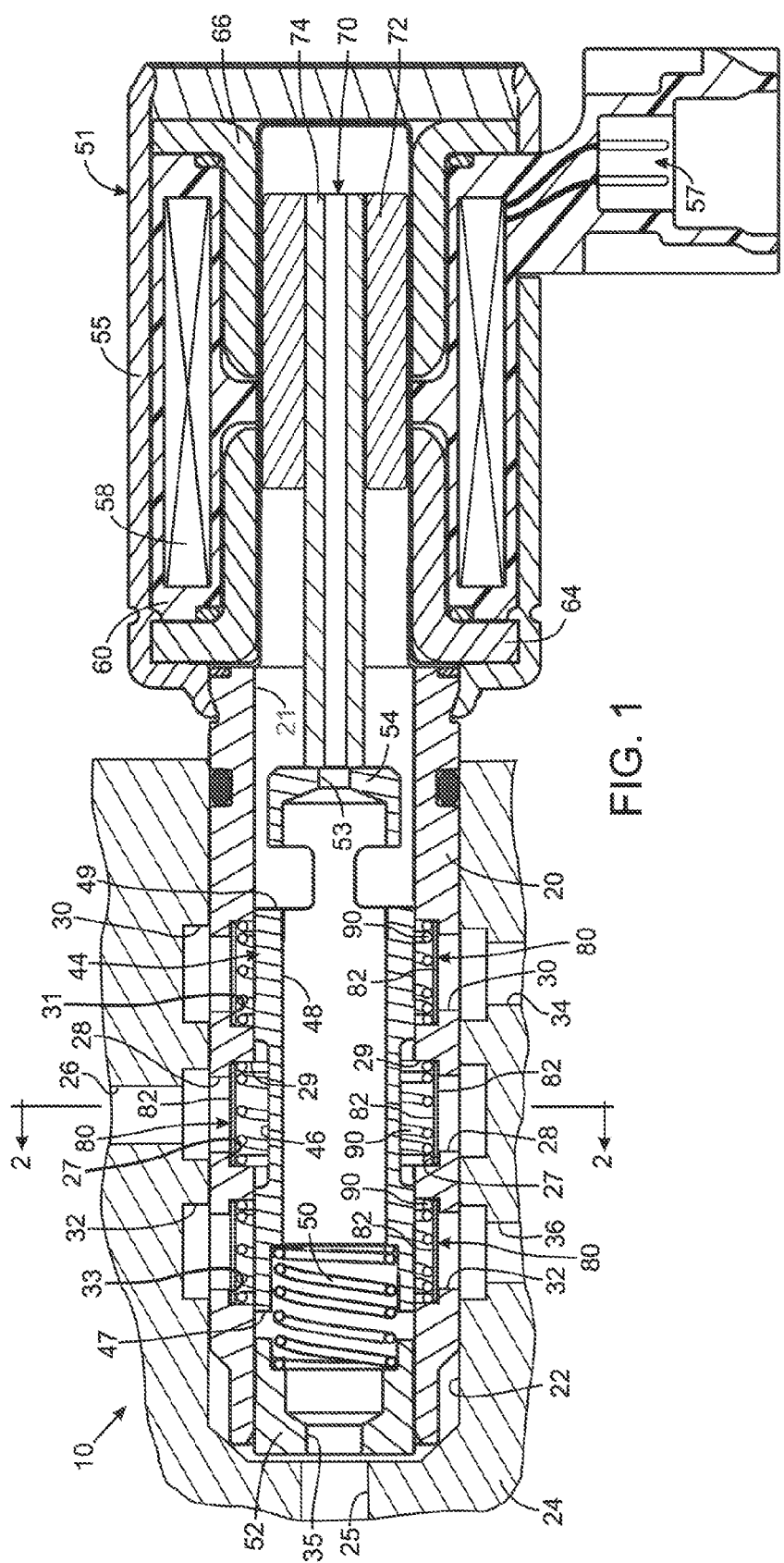
FIG. 1 is a longitudinal cross sectional view through an electrohydraulic valve that incorporates a filter assembly according the present invention.

The present invention will be described in the context of an exemplary electrohydraulic valve 10 depicted in FIGS. 1 and 2, however it should be understood that the invention can be practiced with other types of valves, The electrohydraulic valve 10 has a tubular valve body 20 that during use is inserted into an aperture 22 in a manifold 24. The tubular valve body 20 has a longitudinal bore 21 into which a plurality of ports open. A supply passage 26 in the manifold 24 conveys pressurized fluid from a pump or other source to a plurality of inlet ports 28 in the valve body 20. Although the exemplary valve 10 has six inlet ports 28 in FIG. 2, other amounts of ports can be provided. Each inlet port 28 opens through an inner circumferential surface 27 into a first annular recess 29 formed in the curved surface of the valve body's longitudinal bore 21. A plurality of first and second workports 30 and 32 in the tubular valve body 20 provide fluid paths between the longitudinal bore 21 and manifold passages 34 and 36 that lead to a hydraulic actuator which is driven by the fluid. The first and second workports 30 and 32 open into second and third annular recesses 31 and 33, respectively, in the curved surface of the longitudinal bore 21. As with the inlet ports, there may be a plurality of first workports 30 and a plurality of second workports 32 spaced radially around the bore 21. At the inner end of the manifold aperture 22, a return passage 25 communicates with an outlet port 35 in the valve body to convey fluid back to a tank of the hydraulic system.

A valve element in the form of a spool 44 is slideably received within the longitudinal bore 21 in the valve body 20 and has an exterior annular notch 46. In selected positions of the spool, the exterior annular notch 46 provides a fluid path between the inlet and outlet ports 28 and 35 and the two workports 30 and 32, and thus between the associated manifold passages. In a middle position of the spool travel that is illustrated in FIG. 1, the inlet port 28 is closed from both workports 30 and 32 which also are blocked by lands on the spool 44. A central passage 48 extends though the spool 44 between the opposite ends 47 and 49 and in leftward spool positions provides a path between the first workport 30 and the outlet port 35. A head 54 projects from the outward end 49 of the valve spool 44 and has an aperture 53 there through. A valve spring 50 biases the inward end of the spool 44 away from a nose piece 52 at one end of the valve body 20 at which the outlet port 35 is located.

The valve 10 also includes a linear actuator 51 attached to the opposite end of the valve body 20. The linear actuator 51 has a metal outer housing 55 that encloses a solenoid coil 58 wound in a non-magnetic bobbin 60. Two magnetically conductive pole pieces 64 and 66 that extend into opposite ends of the bobbin 60 and both have a central aperture extending there through. An actuator plunger 70 is slideably received within central apertures of the pole pieces 64 and 66 and thus within the central opening of the solenoid coil 58. The actuator plunger 70 includes a cylindrical armature 72 of ferromagnetic material and a tubular push member 74 that is secured in an aperture through the armature 72. The push member 74 projects outward from the linear actuator 51 and abuts the head 54 of the valve spool 44.

When electric current is applied to the solenoid coil 58, an electromagnetic field is produced that drives the armature 72 and the push member 74 toward the valve spool 44. That action causes the valve spool to move against the bias force of the valve spring 50 and thereby slide in the longitudinal bore 21 of the valve body 20. For example, the solenoid coil 58 can be driven by a pulse width modulated (PWM) electrical signal having a duty cycle that is varied in a conventional manner to move the spool 44 to different desired positions in the valve body 20. The PWM signal is applied to the linear actuator 51 via a connector 57.

Figure 4:
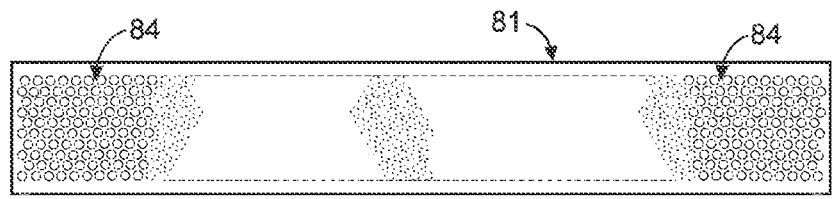
FIG. 4 illustrates a filter sheet that is a component of the filter assembly.
Figure 5:
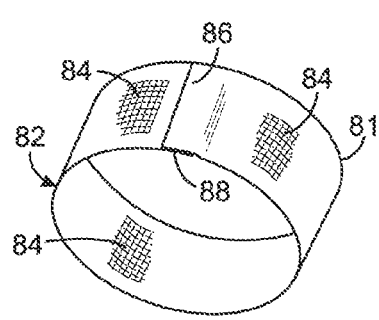
FIG. 5 shows the filter sheet bent into a band as occurs upon being inserted into the valve.

With continuing reference to FIG. 1, a separate filter 80 is located in each annular recess 29, 31 and 33 in the longitudinal bore 21 of the valve body 20 to filter fluid flowing through the inlet ports 28 and the first and second workports 30 and 32. With particular reference to FIG. 4, each filter 80 comprises a thin (e.g., 0.1 mm thick), rectangular strip 81 of metal that has a plurality of apertures 84 between its two major surfaces. For example, a standard photolithographic etching process can be employed to form apertures of a size small enough to prevent undesirable particles from entering and adversely affecting operation of the valve 10. The strip 81 is bent into a curve with a first end section 86 overlapping a second end section 88, thereby forming an annular filter band 82, as specifically shown in FIG. 5.

Figure 6:
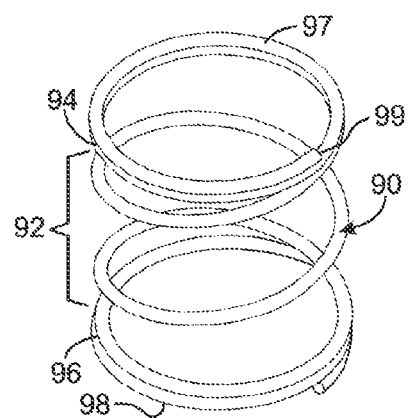
FIG. 6 shows a retention spring used to hold the filter band in position inside the valve.

As shown in FIG. 1, a separate filter band 82 is held against the curved circumferential surface 27 of each annular recesses 29, 31 and 33 by a helical retention spring 90. The details of one of the retention springs 90 are illustrated in FIG. 6. The center convolutions, or turns, 92 of the helical spring are spaced apart, whereas two convolutions 94 and 96 at each end of the helix abut each other, thereby forming a generally flat end surface 97 and 98, respectively. The outermost convolution is closed meaning that the end 99 of the wire, which forms the spring, touches the wire near the beginning of the outermost convolution and is not spaced apart as are the center convolutions 92. Alternatively, each flat end surface 97 and 98 could be formed by only a single closed convolution.

Figure 2:
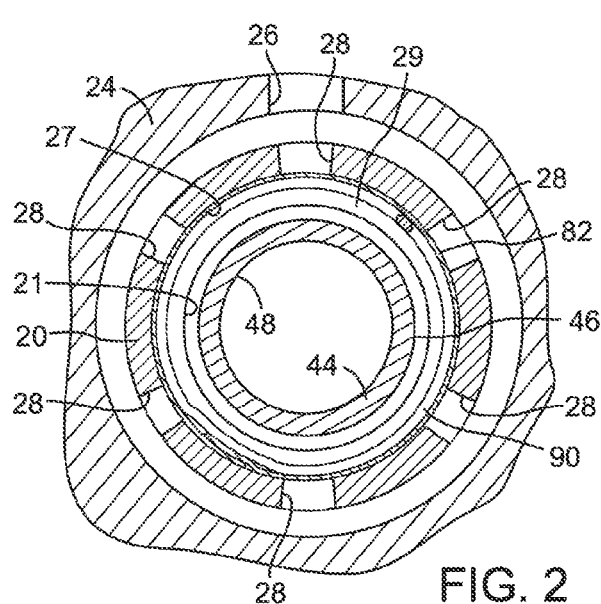
FIG. 2 is a cross sectional view through the valve along line 2-2 in FIG. 1.
Figure 3:
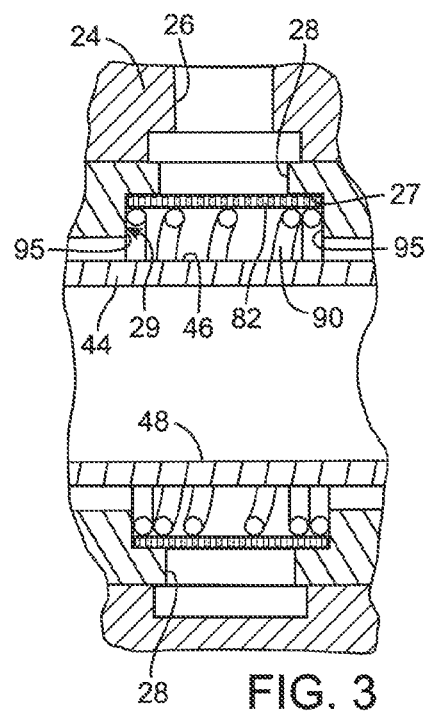
FIG. 3 is an enlarged section of FIG. 1 showing the area where an input port opens into the valve bore and a filter assembly at that location.

With additional reference to FIGS. 1, 2 and 3, when the retention spring 90 is installed in one of the annular recesses 29, 31 and 33, the flat ends engage the annular side walls 95 on opposite sides of the circumferential surface 27 of the recess. As a result, the retention spring 90 extends across the entire width of the respective recess 29, 31 or 33 and holds the edges of the associated filter band 82 against the circumferential surface 27. Thus the opening of the respective inlet port 28 or workports 30 or 32 into the recess is tightly covered by the filter band 82. This restraint of the filter band 82 by the helical retention spring 90 inhibits fluid pressure and flow from the respective port from collapsing the band away from the circumferential surface 27 and opening a fluid path around the filter 80. The helical retention spring 90 also inhibits that pressure and flow from moving a filter band 82 partially out of the respective recess 29, 31 or 33 and into the annular notch 46, where the filter band would interfere with the sliding motion of the valve spool 44. This retention is achieved by the convolutions of the helical retention spring 90 applying force evenly across the entire width of the filter band 82. The flat ends of the retention spring 90 engaging the annular side walls 95 on opposite sides of the circumferential surface 27 of the recess prevent the retention spring from sliding across the width of the filter band 82.

The filters 80 are inserted one at a time into the valve body 20 before the spool 44 in placed into the longitudinal bore 21. A funnel shaped tool may be employed for that process. The tool has a long tube that is inserted into the longitudinal bore 21 with an open end of the tube positioned adjacent the particular recess 29, 31 or 33 into which the filter is to be placed. A cylindrical filter band 82 in inserted into the funnel and pushed inward into the tube of the tool, thereby contracting the diameter of the band, enabling the band to slide through the tube. The filter band 82 ultimately is pushed out of the end of the tool and into the recess in the longitudinal bore 21. At that time, the resiliency of the filter band 82 causes it to expand diametrically into the recess until the band rests against the curved circumferential surface 27. Then a similar process is used to place a retention spring 90 into the same recess. When the retention spring 90 expands diametrically upon exiting the insertion tool, the outer circumferential edges of each convolution of the helix exerts an outward radial force against the filter band 82, further holding the band against the curved circumferential surface 27 of the recess. The flat ends of the installed retention spring 90 engage the opposite annular side walls 95 of the recess to center the spring in the recess. In the installed state, the abutting convolutions 94 and 96 at those ends of the retention spring secure the edges of the filter band 82 against the recess's circumferential surface 27. The force of that securing inhibits pressure in the respective port from bending the band away from the circumferential surface 27

Although the present filter band has been described in the context of use on an electrohydraulic spool valve, it should be understood that the band can be used on other types of valves. Furthermore, the valve may have a greater or lesser number of ports and thus recesses in the valve body's longitudinal bore.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An hydraulic valve comprising:
   a valve body having a longitudinal bore and an annular recess that has a circumferential surface through which a fluid port opens;
   a filter band having a plurality of apertures there through and abutting the circumferential surface;
   a helical spring with spaced apart convolutions that engage and exert outward radial force against the filter band thereby holding the filter band abutting the circumferential surface; and
   a valve element moveably received within the longitudinal bore to control flow of fluid through the fluid port.

2. The hydraulic valve as recited in claim 1 wherein the first filter band has an outer circumference, wherein the entire outer circumference, except for where the fluid port opens, abuts the circumferential surface.

3. The hydraulic valve as recited in claim 1 wherein the filter band comprises a solid sheet with opposing ends wherein the solid sheet is formed into a cylinder with the opposing ends overlapping.

4. The hydraulic valve as recited in claim 1 wherein the annular recess has two side surfaces at opposite sides of the circumferential surface; and the helical spring engages both of the side surfaces.

5. The hydraulic valve as recited in claim 1 wherein the helical spring has opposite ends, and has a closed convolution at each end.

6. The hydraulic valve as recited in claim 1 wherein the helical spring has one end at which two convolutions abut each other.

7. The hydraulic valve as recited in claim 1 wherein the helical spring has a first end at which two convolutions abut each other, and has a second end at which another two convolutions abut each other.

8. The hydraulic valve as recited in claim 1 further comprising an actuator operably coupled to move the valve element into different positions within the longitudinal bore.

9. An hydraulic valve comprising:
   a valve body including a bore, a first annular recess having a first circumferential surface and a second annular recess having a second circumferential surface, the valve body further including a first port opening through the first circumferential surface and a second port opening through the second circumferential surface;
   a first filter band having a plurality of apertures there through and located within the first annular recess abutting the first circumferential surface and extending over an opening of the first port through the first circumferential surface;
   a first helical spring having spaced apart convolutions that engage and exert outward radial force onto the first filter band thereby holding the first filter band against the first circumferential surface;
   a valve element moveable into different positions within the bore of the valve body thereby selectively connecting and disconnecting the first and second fluid ports; and
   an actuator operably coupled to move the valve element into the different positions.

10. The hydraulic valve as recited in claim 9 wherein the first filter band has an outer circumference, wherein the outer circumference, except for where the first port opens, abuts the first circumferential surface.

11. The hydraulic valve as recited in claim 9 wherein the filter band comprises a strip of solid material with opposite ends, wherein the strip is formed into a cylinder with the opposite ends overlapping.

12. The hydraulic valve as recited in claim 9 wherein the annular recess has two side surfaces at opposite sides of the circumferential surface; and the helical spring engages both of the side surfaces.

13. The hydraulic valve as recited in claim 9 wherein the helical spring has opposite ends, and has a closed convolution at each end.

14. The hydraulic valve as recited in claim 9 wherein the helical spring has one end at which two convolutions abut each other.

15. The hydraulic valve as recited in claim 9 wherein the helical spring has a first end at which two convolutions abut each other, and has a second end at which another two convolutions abut each other.

16. The hydraulic valve as recited in claim 9 further comprising:
   a second filter band having a plurality of apertures there through and located within the second annular recess abutting the second circumferential surface and extending over an opening of the second port through the second circumferential surface;
   a second helical spring with spaced apart convolutions that engage and exert outward radial force onto the second filter band thereby holding the second filter band against the second circumferential surface.

17. The hydraulic valve as recited in claim 16 wherein the first filter band has a first outer circumference, wherein the entire first outer circumference, except for where the first port opens, abuts the first circumferential surface; and the second filter band has a second outer circumference, wherein the entire second outer circumference, except for where the second port opens, abuts the second circumferential surface.

18. The hydraulic valve as recited in claim 16 wherein each of the first and second filter bands comprises a strip of material with opposing ends wherein the strip is formed into a cylinder with the opposing ends overlapping.

19. The hydraulic valve as recited in claim 16 wherein:
   the first annular recess has first and second side surfaces at opposite sides of the first circumferential surface, and the first helical spring engages the first and second side surfaces; and
   the second annular recess has third and fourth side surfaces at opposite sides of the second circumferential surface, and the second helical spring engages the third and fourth side surfaces.

20. The hydraulic valve as recited in claim 16 wherein each of the first and second helical springs has a first end at which two convolutions abut each other and a second end at which another two convolutions abut each other.

* * * * *

UNITED STATES PATENT AND TRADEMARK OFFICE
CERTIFICATE OF CORRECTION

PATENT NO. : 8,656,948 B2  
APPLICATION NO. : 13/231486  
DATED : February 25, 2014  
INVENTOR(S) : Kirt N. Stephens Page 1 of 1

It is certified that error appears in the above-identified patent and that said Letters Patent is hereby corrected as shown below:

On the Title Page, Item (57), Replace the abstract with:

An hydraulic valve has a body with a longitudinal bore therein. An annular recess is formed within the longitudinal bore and has a circumferential surface through which a fluid port opens. A filter band, with a plurality of apertures there through, is located within the annular recess abutting the circumferential surface. A helical spring has spaced apart convolutions that engage the filter band and exert an outward radial force which holds the filter band against the circumferential surface of the bore recess. A valve element, such as a spool, is slideably received within the longitudinal bore to control flow of fluid through the fluid port.

In the Specification

In column 1, line 33, change "control" to --controls--.

Signed and Sealed this
Thirteenth Day of May, 2014

Michelle K. Lee
*Deputy Director of the United States Patent and Trademark Office*